United States Patent [19]

Currie

[11] Patent Number: 4,515,224
[45] Date of Patent: May 7, 1985

[54] SEED DRILL WITH IMPROVED SEED DISC MEANS

[76] Inventor: Corliss H. Currie, Rte. 2, Box 154, Bennington, Okla. 74723

[21] Appl. No.: 490,778

[22] Filed: May 2, 1983

[51] Int. Cl.³ .................... A01C 5/06; A01B 35/28
[52] U.S. Cl. .................... 172/572; 172/574; 111/87
[58] Field of Search .................... 172/572, 573, 574; 111/87, 88, 85

[56] References Cited

U.S. PATENT DOCUMENTS

| | | | |
|---|---|---|---|
| 534,880 | 2/1895 | Haworth | 111/62 |
| 713,976 | 11/1902 | Funk | 111/87 |
| T862,011 | 5/1969 | Koronka | 111/88 |
| 1,046,872 | 12/1912 | Sessler | 172/573 |
| 1,061,596 | 5/1913 | Burns | 111/87 |
| 1,330,451 | 2/1920 | Salmon | 111/87 |
| 1,642,908 | 9/1927 | Taylor | 172/573 |
| 1,817,851 | 8/1931 | Shelton | 172/573 X |
| 2,422,409 | 6/1947 | Greenroyd | 172/551 |
| 2,429,841 | 10/1947 | Phillips | 111/87 |
| 3,705,560 | 12/1972 | Lappin | 172/484 |
| 4,214,537 | 7/1980 | Bailey | 111/85 |
| 4,289,081 | 9/1981 | Koronka | 111/88 |

FOREIGN PATENT DOCUMENTS 132325  9/1919  United Kingdom .................. 111/87

Primary Examiner—Richard J. Johnson
Attorney, Agent, or Firm—Head, Johnson & Stevenson

[57] ABSTRACT

A seed drill apparatus comprising at least two complementary rotatable seed discs journalled in tandem relation whereby one of the discs is a leading disc and the other of the discs is a trailing disc. The plane of each disc is canted with respect to the direction of travel for the apparatus, with the plane of the leading disc being of an orientation opposed with respect to the orientation of the plane of the trailing disc. The canted position of the seed discs creates a combined plowing and grooving action for the disc as the apparatus moves over the surface of the ground, thus opening and widening an efficient seed receiving groove in the ground regardless of whether or not the ground has been prepared by plowing, or the like.

6 Claims, 4 Drawing Figures

SEED DRILL WITH IMPROVED SEED DISC MEANS

BACKGROUND OF THE INVENTION

1. Field of the Invention

This invention relates to improvements in seed drill apparatus and more particularly, but not by way of limitation, to a seed drill having cooperating seed disc means for preparing a seed receiving groove in the earth, whether or not the surface of the ground has been plowed or otherwise previously prepared for planting.

2. Description of the Prior Art

The opening of ruts or longitudinally extending grooves in the surface of the earth for planting of seeds therein is an old and well known planting procedure. The usual or standard procedure in widespread use today includes the preparing of the ground or earth by plowing, tilling, or the like, prior to the seed planting operation. Seed drill apparatus comprising a plurality of earth penetrating discs disposed in spaced, side-by-side relation for producing the seed receiving grooves is frequently utilized, and the discs provided on the present day seed drills normally penetrate or open the earth in relatively narrow slits with substantially straight or vertically disposed, longitudinally extending sidewalls. In some instances, the discs are disposed in a tandem arrangement wherein the leading disc initially opens the groove, and the trailing disc widens the initial groove for facilitating the depositing of seeds in the groove. For example, a Defense Publication of Koronka et al., No. 777,309, shows the use of two discs, with the first disc being a slit cutting disc for initially opening the seed receiving groove and the second disc serving to widen the initial slit for facilitating the depositing of the seeds in the groove. Another seed drill apparatus is shown in the Coulter U.S. Pat. No. 4,289,081 wherein two discs are mounted in tandem relation, but the point of rotation of the discs is offset from each other due to relatively close physical relation between the discs. The Bailey U.S. Pat. No. 4,214,537 relates to a seed drill having a plurality of discs arranged in a row, with the discs being angled toward each other. These devices have certain disadvantages, however, in that the usual cross sectional configuration of the seed receiving groove is usually such that the depositing of the seeds at the center or bottom of the groove may be difficult and somewhat uncontrolled. In addition, the present day seed drill devices normally require that the ground be plowed, tilled, or the like, prior to the use of the apparatus for preparing the seed receiving grooves.

SUMMARY OF THE INVENTION

The present invention contemplates a novel seed drill particularly designed and constructed for overcoming the foregoing disadvantages. The novel seed drill comprises a wheeled main frame structure carrying or supporting at least two seed discs arranged in tandem or trailing relation. The planes of the two tandem discs are non-coplanar, with the plane of each disc being canted with respect to the surface of the ground. The plane of the leading disc is canted in an opposite direction with respect to the plane of the trailing disc, and as a result, the leading disc performs a substantially combined plowing and grooving action for initially opening the seed receiving groove, and the trailing disc follows with a general similar action, thus widening the seed receiving groove and providing a more efficient cross sectional configuration therefor in order to enhance the depositing of the seeds in the groove. It may be desirable to provide a "gang" or plurality of spaced complementary pairs of trailing or tandem seed discs on the main frame whereby a plurality of substantially mutually parallel seed receiving grooves may be simultaneously opened as the seed drill is moved over the surface of the earth. The combined plowing and grooving action of the canted seed discs facilitates the provision of the seed grooves regardless of the condition of the earth being traversed, thus facilitating the seeding of sod, pasture ground, or the like. The novel seed drill is simple and efficient in operation and economical and durable in construction.

DETAILED DESCRIPTION OF THE PREFERRED EMBODIMENT

Figure 2:
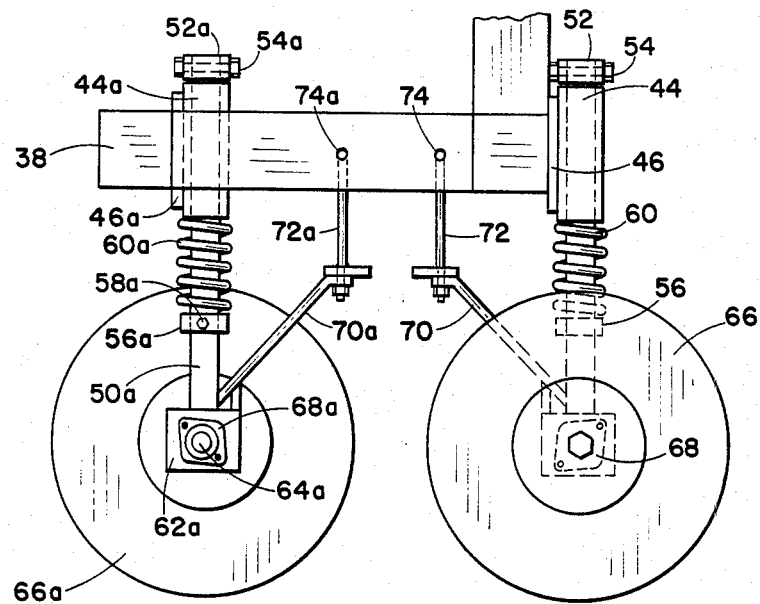
FIG. 2 is an enlarged side elevational view of a pair of tandem seed discs of a seed drill apparatus embodying the invention and illustrating a portion of the main frame.

Referring to the drawings in detail, reference character 10 generally indicates a seed drill apparatus comprising a main frame structure 12 supporting a suitable hopper or seed reservoir 14 for receiving and storing a quantity of seed therein, and having the bottom thereof open to a suitable transversely extending delivery through means 16, as is well known. A housing means 18 is normally supported on the main frame 12 in any well known manner and houses a suitable power means (not shown) operably connected with a pulley and chain drive means 20. The pulley and chain drive means 20 is operably connected with a rotary gate or delivery means (not shown) extending across the lower portion of the seed reservoir 14 and normally interposed between the interior of the reservoir 14 and the trough 16. The rotary delivery means usually functions to receive a preselected quantity of seed from the reservoir 14 by gravity and depositing the said quantity of seed into the trough means 16 as the delivery means is rotated during operation of the apparatus 10, as will be hereinafter set forth in detail.

Figure 1:
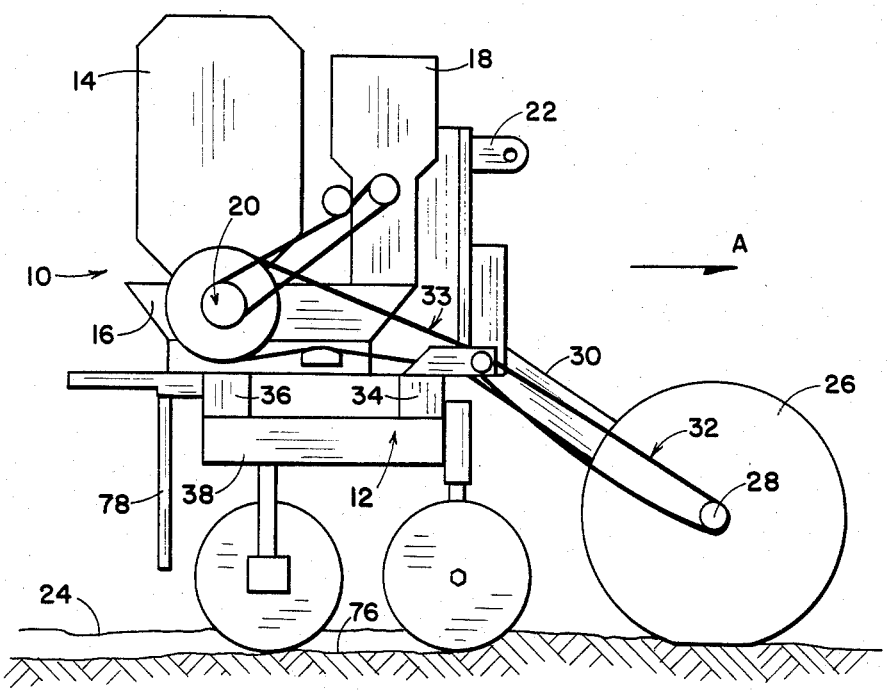
FIG. 1 is a side elevational view of a seed drill apparatus embodying the invention.

A suitable bracket means 22 is normally provided on the main frame means 12 for connection with a towing vehicle, such as a tractor or the like (not shown) whereby the apparatus 10 may be moved over the surface 24 of the ground in the direction indicated by the arrow A in FIG. 1 during utilization of the apparatus 10. In addition it is the normal practice to provide a pair of spaced axially aligned wheels 26 (only one of which is shown in FIG. 1) which are suitable journalled on a respective axis 28 suspended from the main frame 12 by a forwardly and angularly extending support arm 30, as is well known. The pulley and chain drive means 20 may be operably connected with at least one of the wheels 26 by means of interconnecting chain drive assemblies 32 and 33, if desired.

Figure 3:
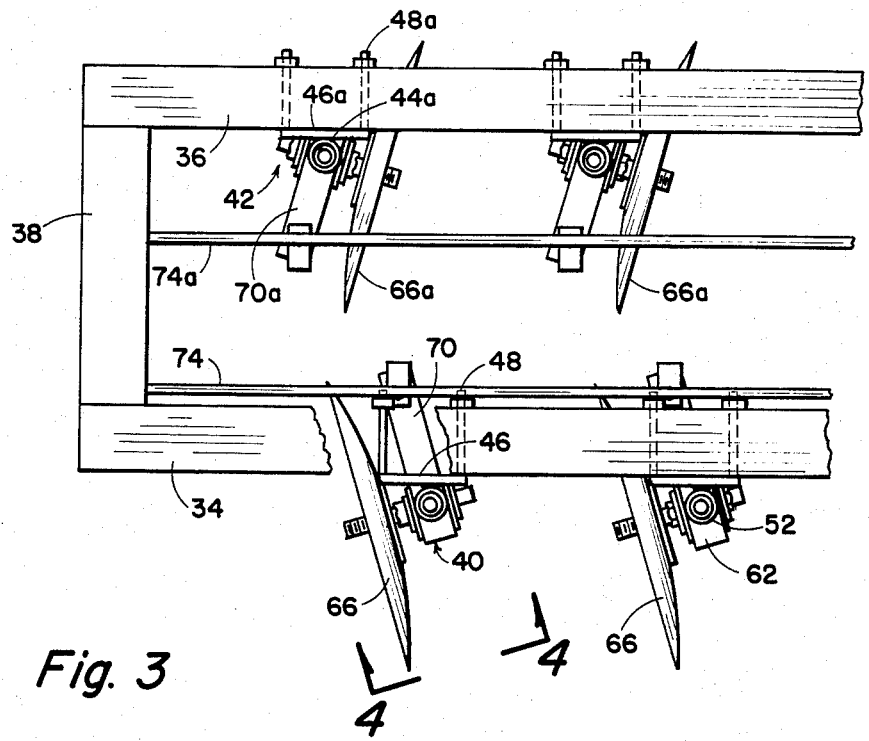
FIG. 3 is a broken plan view of a portion of a seed drill apparatus embodying the invention and illustrating a plurality of seed discs supported by the main frame.

The main frame 12 includes a pair of spaced cross members 34 and 36 having opposite ends thereof secured to and supported by a oppositely disposed channel members 38 (only one of which is shown in FIGS. 1 and 3). A plurality of substantially identical seed disc assemblies generally indicated at 40 are secured to the cross member 34 and longitudinally spaced therealong, as particularly shown in FIG. 3. A plurality of similar seed disc assemblies 42 are secured to the cross member 36 and longitudinally spaced therealong. Each seed disc assembly 42 is disposed in a trailing relation with respect to an associated seed disc assembly 40 for a purpose as will be hereinafter set forth.

Each seed disc assembly 40 comprises a sleeve member 44 welded or otherwise secured to a plate number 46 which is secured to the cross member 34 in any suitable manner, such as by bolts 48. A rod 50 is slidably and rotatably disposed within the sleeve 44. A collar member 52 is secured to the outer or upper end of the rod 50 in any well known manner, such as by a bolt 54, for limiting the movement of the rod 50 with respect to the sleeve 44 in one direction. A stop member 46 is adjustably secured to the outer periphery of the rod 50 in any suitable manner, such as by a plurality of set screws 58, or the like, and is spaced from the sleeve 44. A suitable helical spring means 60 is disposed around the outer periphery of the rod 50 and has the opposite ends suitably anchored to the stop means 56 and lower end of the sleeve 44. The spring 60 constantly urges the stop means 56 in a direction away from the sleeve 44, thus urging the rod 50 in a downwardly direction, as viewed in the drawings, for a purpose as will be hereinafter set forth.

Figure 4:
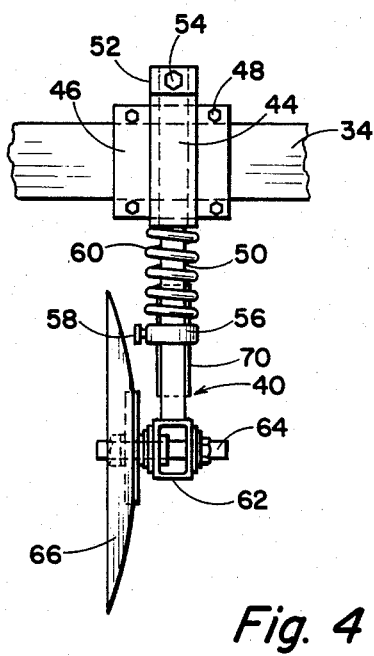
FIG. 4 is a view taken on line 4—4 of FIG. 3.

A housing or box means 62 is secured to the lower end of the rod 50 in any suitable manner, such as by welding, for receiving a stub axle 64 therethrough, as particularly shown in FIG. 4. The axis of the axle 64 is substantially perpendicular with respect to the axis of the rod 50 and a substantially dish-shaped seed disc 66 is suitably journalled in the proximity of one end of the axle 64 by a bearing means 68 for rotation about the longitudinal axis thereof. The outer periphery of the seed disc 66 is sharpened for biting into the surface 24 of the earth during use of the apparatus 10 as will be hereinafter set forth. An angularly disposed stabilizer strap means 70 has one end welded or otherwise secured to the outer periphery of the rod 50 and the opposite end slidably secured to an upstanding post means 72 in any well known manner. The post means 72 is secured to a rod member 74 which is suitably secured between the spaced end channel members 38. The plane of the seed disc 66 is canted or disposed at an angle with respect to the direction of travel of the apparatus 10 whereby the penetration of the earth's surface 24 by the seed disc 66 is essentially a combined plowing and grooving action.

Each seed disc assembly 42 is substantially identical to the seed disc assemblies 40 and each comprises a sleeve member 44a welded or otherwise secured to a plate member 46a which is secured to the cross member 26 in any suitable manner, such as by bolts 48a. A rod 50a is slidably and rotatably disposed within the sleeve 44a. A collar member 52a is secured to the outer or upper end of the rod 50a in any well known manner, such as by a bolt 54a, for limiting the movement of the rod 50a with respect to the sleeve 44a in one direction. A stop member 46a is adjustably secured to the outer periphery of the rod 50a in any suitable manner, such as by a plurality of set screws 58a, or the like, and is spaced from the sleeve 44a. A suitable helical spring means 60a is disposed around the outer periphery of the rod 50a and has the opposite ends suitably anchored to the stop means 56a and lower end of the sleeve 44a. The spring 60a constantly urges the stop means 56a in a direction away from the sleeve 44a, thus urging the rod 50a in a downwardly direction, as viewed in the drawings, for a purpose as will be hereinafter set forth.

A housing or box means 62a is secured to the lower end of the rod 50a in any suitable manner, such as by welding, for receiving a stub axle 64a therethrough. The axis of the axle 64a is substantially perpendicular with respect to the axis of the rod 50a and is a substantially dish-shaped seed disc 66 is suitably journalled in the proximity of one end of the axle 64a by a bearing means 68a for rotation about the longitudinal axis thereof. The outer periphery of the seed disc 66a is sharpened for biting into the surface 24 of the earth during use of the apparatus 10 as will be hereinafter set forth. An angularly disposed stabilizer strap means 70a has one end welded or otherwise secured to the outer periphery of the rod 50a and the opposite end slidably secured to an upstanding post means 72a in any well known manner. The post means 72a is secured to a rod member 74a which is suitably secured between the spaced end channel members 38. The rod member 74a is spaced from and preferably substantially parallel with the rod member 74. The plane of the seed disc 66a is canted or disposed at an angle with respect to the direction of travel of the apparatus 10 whereby the penetration of the earths' surface 24 by the seed disc 66a is essentially a combined plowing and grooving action.

It will be seen in FIG. 3 that the direction of the cant or angular orientation of the seed disc 66 is in an opposite direction with respect to the cant or angular orientation of the seed disc 66a. It is also seen that the assemblies 40 and 42 are secured to the respective cross member 34 and 36 in such a manner that each assembly 40 is a leading assembly for a corresponding assembly 42. The seed disc 66 of each assembly 40 initially penetrates the surface 24 for opening a seed receiving groove 76 therein. The seed disc 66a of each assembly 42 trails or follows in the trace of the leading seed disc 66 and widens the groove 76 to provide a more efficient area for receiving the seeds (not shown) therein.

It is the usual practice to provide a seed delivery tube means 78 in substantial alignment with each seed disc 66a and in rearwardly spaced relation with respect thereto for depositing seed in the groove 76 subsequent to the opening and widening of the groove by the discs 66 and 66a. The delivery tube means 78 is preferably secured to the main frame means 12 in any suitable manner, and is in open communications with the trough means 16 for receiving a supply of seeds therefrom. The seeds fall through the tube means 78 by gravity for discharge directly into the seed receiving groove 76.

In use, the apparatus 10 may be secured to a suitable towing vehicle such as a tractor (not shown) by securing the bracket means 22 to the usual connecting means normally provided on the towing vehicle. Whereas a single set of aligned or complementary seed disc assemblies 40 and 42 may be provided on the apparatus 10, it is preferably to provide a "gang" of the complementary assemblies 40 and 42 whereby a plurality of substantially mutually parallel seed receiving grooves 76 may be opened in the surface 24 during utilization of the apparatus 10. As the apparatus moves over the surface 24, the seed discs 66 and 66a are constantly urged in a downward direction by the spring means 60 and 60a, respectively, and the sharpened outer periphery of each seed disc 66 and 66a engages the surface 24 in a manner to provide a combined plowing and grooving action, thus providing an efficient grooving of the surface 24 regardless of whether or not the surface 24 has been prepared by plowing, tilling, or the like. The discs 66 and 66a efficiently dig or cut through sod, natural pasture land, or the like and the complementary canted orientation of each corresponding pair of seed discs 66 and 66a results in the opening of a relatively wide seed receiving groove for improving or increasing the seeding efficiency during use of the apparatus 10. Of course, the action of the spring means 60 and 60a compensates for fluctuations in the contour of the surface 24 for assuring an efficient penetration of the earth during the entire grooving operation. It is to be noted that suitable trailing means (not shown) may be towed behind the apparatus 10 for smoothing and filling of the groove 76 subsequent to the depositing of the seeds therein, as is well known.

From the foregoing, it will be apparent that the present invention provides a novel seed drill apparatus comprising a wheeled main frame having at least one pair of complementary seed discs journalled therein substantially tandem relation. The outer periphery of each seed disc is sharpened for penetration of the surface of the ground, and the plane of each seed disc is canted with respect to the direction of travel of the apparatus whereby the discs function in a combined substantially plowing and grooving action whereby seed receiving grooves may be opened in the surface of the ground regardless of whether or not the ground has been prepared by plowing, tilling, or the like. The canted orientation of the leading seed disc is in the direction opposed to the canted orientation of the trailing seed disc whereby the leading seed disc initially opens the groove and the trailing seed disc widens the groove for facilitating the introduction of the seeds into the groove.

Whereas the present invention has been described in particular relation to the drawings attached hereto, it should be understood that other and further modifications, apart from those shown or suggested therein may be made within the spirit and scope of this invention.

What is claimed is:

1. A seed drill apparatus comprising wheeled main frame means, at least two rod members slidably and rotatably secured to the main frame means in tandem relation with respect to one another, a seed disc means journalled at the lower end of each rod member for rotation about its own longitudinal axis, yieldable means disposed around the outer periphery of each rod member for constantly urging the respective seed disc independently in a downward direction for engagement with the surface of the earth, the plane of each seed disc being canted with respect to the direction of travel of the seed drill apparatus whereby a combined plowing and groove action is produced at the surface of the ground to provide at least one seed receiving groove during movement of the seed drill apparatus.

2. A seed drill apparatus as set forth in claim 1 wherein the canted orientation of the plane of one of the seed discs is in an opposite direction with respect to the canted orientation of the plane of the other of the seed discs.

3. A seed drill apparatus as set forth in claim 1 wherein each seed disc is of a substantially dish-shaped configuration having the outer periphery thereof sharpened for penetration of the earth.

4. A seed drill apparatus as set forth in claim 3 and including means for securing each seed disc for rotation about its own longitudinal axis.

5. A seed drill apparatus comprising wheeled main frame means, at least two rotatable seed discs independently yieldably supported by the main frame means and disposed in tandem relation, each seed drill having the plane thereof in a canted orientation with respect to the direction of travel of the seed drill apparatus for penetrating the earth in a combined plowing and grooving action for producing a seed receiving groove regardless of the condition of the earth, and including means carried by the main frame means for supporting the seed drills in a manner to compensate for variations of contour in the surface of the earth, and wherein the means carried by the main frame means comprises sleeve means, rod means secured to a seed disc and reciprocally and rotatably disposed in the sleeve means, first stop means secured to the rod means for limiting the reciprocal movement of the rod means in one direction, second stop means secured to the rod means in spaced relation with respect to the sleeve means for limiting the reciprocal movement of the rod means in an opposite direction, helical spring means disposed around the outer periphery of the rod means and interposed between the sleeve means and second stop means for constantly urging the seed disc in a direction away from the sleeve means, and stabilizing means secured between the rod means and the main frame means for facilitating the movement of the seed disc over the surface of the earth.

6. A seed drill apparatus as set forth in claim 5 and including a plurality of complementary pairs of seed discs independently secured to the main frame means in tandem relation, each pair of seed discs being spaced from the adjacent pair of seed discs to provide a "gang" of discs for the seed drill apparatus.

* * * * *